(12) United States Patent
Kang (10) Patent No.: US 11,040,287 B2
(45) Date of Patent: Jun. 22, 2021

(54) EXPERIENCE-ORIENTED VIRTUAL BASEBALL GAME APPARATUS AND VIRTUAL BASEBALL GAME CONTROL METHOD USING THE SAME

(71) Applicant: NEWDIN CONTENTS CO., LTD., Seoul (KR)

(72) Inventor: Jin Young Kang, Yangju-si (KR)

(73) Assignee: NEWDIN CONTENTS CO., LTD., Seoul (KR)

( * ) Notice: Subject to any disclaimer, the term of this patent is extended or adjusted under 35 U.S.C. 154(b) by 300 days.

(21) Appl. No.: 16/322,501

(22) PCT Filed: Jul. 14, 2017

(86) PCT No.: PCT/KR2017/007573
§ 371 (c)(1),
(2) Date: Feb. 1, 2019

(87) PCT Pub. No.: WO2018/030656
PCT Pub. Date: Feb. 15, 2018

(65) Prior Publication Data
US 2019/0201794 A1 Jul. 4, 2019

(30) Foreign Application Priority Data
Aug. 12, 2016 (KR) .......................... 10-2016-0103050

(51) Int. Cl.
*A63F 13/812* (2014.01)
*A63B 71/06* (2006.01)
(Continued)

(52) U.S. Cl.
CPC .............. *A63F 13/812* (2014.09); *A63B 1/00* (2013.01); *A63B 24/00* (2013.01);
(Continued)

(58) Field of Classification Search
None
See application file for complete search history.

(56) References Cited

U.S. PATENT DOCUMENTS

2004/0239915 A1* 12/2004 Anderson ................. G01P 3/68
356/28
2009/0170642 A1* 7/2009 Ono .................... A63B 24/0021
473/455

(Continued)

FOREIGN PATENT DOCUMENTS

JP  2001-286592 A  10/2001
JP  2014-014467 A  1/2014

(Continued)

OTHER PUBLICATIONS

International Search Report for PCT/KR2017/007573 dated Nov. 7, 2017 from Korean Intellectual Property Office.

*Primary Examiner* — Jason T Yen
(74) *Attorney, Agent, or Firm* — Revolution IP, PLLC (57) ABSTRACT

Disclosed are an experience-oriented virtual baseball game apparatus that enables a user to practice baseball or play a baseball game with a virtual player in a virtual baseball image projected on a screen based on the virtual baseball image, configured such that the user experiences a very interesting war of nerves between a pitcher and a batter, for example, the user pitches a ball toward the screen in order to induce a virtual batter in the image to ground out or to fly out through the location of his/her pitch or the virtual batter makes a hit or hits a home run due to a careless pitch of the user, through the baseball game, and a virtual baseball game control method using the same.

12 Claims, 7 Drawing Sheets

(51) Int. Cl.
  *A63B 1/00* (2006.01)
  *A63B 24/00* (2006.01)
  *A63B 69/00* (2006.01)
  *A63F 13/213* (2014.01)
  *A63F 13/27* (2014.01)
  *A63F 13/426* (2014.01)
  *G06T 7/70* (2017.01)
  *G06T 7/20* (2017.01)

(52) U.S. Cl.
  CPC .......... *A63B 24/0021* (2013.01); *A63B 69/00* (2013.01); *A63B 69/0002* (2013.01); *A63B 71/06* (2013.01); *A63B 71/0622* (2013.01); *A63F 13/213* (2014.09); *A63F 13/27* (2014.09); *A63F 13/426* (2014.09); *G06T 7/20* (2013.01); *G06T 7/70* (2017.01); *A63B 2024/0034* (2013.01); *A63B 2069/0006* (2013.01); *A63B 2071/0636* (2013.01); *A63B 2071/0638* (2013.01); *A63B 2220/807* (2013.01); *G06T 2207/30224* (2013.01)

(56) References Cited

U.S. PATENT DOCUMENTS

| | | | |
|---|---|---|---|
| 2011/0003653 A1* | 1/2011 | Stemle | A63B 69/0002 473/456 |
| 2012/0033855 A1* | 2/2012 | Ryan | G09B 19/0038 382/103 |
| 2013/0157788 A1* | 6/2013 | Moore | A63F 13/812 473/455 |
| 2014/0277636 A1* | 9/2014 | Thurman | A63B 69/0002 700/91 |

FOREIGN PATENT DOCUMENTS

| | | |
|---|---|---|
| JP | 2016-101286 A | 6/2016 |
| KR | 10-2010-0088109 A | 8/2010 |
| KR | 10-1505931 B1 | 3/2015 |
| KR | 10-1543371 B1 | 8/2015 |
| KR | 10-1546666 B1 | 8/2015 |
| KR | 10-2015-0109614 A | 10/2015 |
| KR | 10-1599809 B1 | 3/2016 |

* cited by examiner

EXPERIENCE-ORIENTED VIRTUAL BASEBALL GAME APPARATUS AND VIRTUAL BASEBALL GAME CONTROL METHOD USING THE SAME

TECHNICAL FIELD

The present invention relates to an experience-oriented virtual baseball game apparatus that enables a user on a mound to pitch a ball toward a screen based on a virtual baseball image projected on the screen in an indoor space of a predetermined size and that enables a sensor to sense the pitched ball and to realize a simulation image based on the result of sensing, such as a so-called screen baseball system, and a virtual baseball game control method using the same.

BACKGROUND ART

With the recent increase in the number of people enjoying baseball, a so-called screen baseball system has emerged, which overcomes the limitations of playing baseball in a large baseball stadium and allows people to enjoy playing a virtual baseball game even in a small indoor space while experiencing virtual reality.

Typically, a screen baseball system is configured to have a structure in which a batting area, in which a user, as a batter, hits a ball pitched by a pitching machine, is provided, a mound, on which a user, as a pitcher, pitches a ball, is provided, and a screen capable of displaying a virtual baseball stadium is installed in an indoor space of a predetermined size, and is configured such that, when the user hits a ball in the batting area or when the user pitches a ball toward the screen, a sensor senses the motion of the hit ball or the pitched ball and an image of a baseball game is realized based on the result of sensing.

Examples of such a screen baseball system are disclosed in a large number of related art documents, such as Korean Patent Application No. 10-2010-0088109, Korean Patent Application No. 10-2014-0032569, Korean Patent Application No. 10-2015-0041844, Korean Patent Application No. 10-2015-0041861, and Korean Patent Application No. 10-2014-0054105.

In conventional virtual baseball game apparatuses, including screen baseball systems, which enable a user to practice pitching as a pitcher or to pitch a ball in order to play a baseball game, it is possible only to provide information about whether the ball pitched by the user reaches the interior of a strike zone or information about the position of the strike zone that the ball pitched by the user reaches, but it is not possible for the user to experience a very interesting war of nerves between a pitcher and a batter, for example, the case in which the pitcher induces the batter to ground out or to fly out or the case in which the batter makes a hit or hits a home run due to a careless pitch of the pitcher, through the baseball game.

DISCLOSURE

Technical Problem

It is an object of the present invention to provide an experience-oriented virtual baseball game apparatus that enables a user to practice baseball or play a baseball game with a virtual player in a virtual baseball image projected on a screen based on the virtual baseball image, configured such that the user experiences a very interesting war of nerves between a pitcher and a batter, for example, the case in which the user pitches a ball toward the screen in order to induce a virtual batter in the image to ground out or to fly out through the location of his/her pitch or the case in which the virtual batter makes a hit or hits a home run due to a careless pitch of the user, through the baseball game, and a virtual baseball game control method using the same.

Technical Solution

In accordance with an aspect of the present invention, the above and other objects can be accomplished by the provision of a virtual baseball game control method using an experience-oriented virtual baseball game apparatus that enables a user to practice baseball or play a baseball game with a virtual player in a virtual baseball image projected on a screen based on the virtual baseball image, the virtual baseball game control method including realizing an image for a baseball practice or a baseball game including a virtual batter and a virtual pitcher and displaying a strike zone having a plurality of partitioned regions in the image, specifying at least one of the partitioned regions of the strike zone as an induction region and displaying the induction region so as to be distinguished from other regions, sensing which of the partitioned regions of the strike zone a ball pitched by the user toward the screen reaches, and realizing an image in which the virtual batter performs one of swinging and missing, grounding out, and flying out in the case in which the ball pitched by the user reaches the induction region as the result of sensing performed by a sensor.

In accordance with another aspect of the present invention, there is provided a virtual baseball game control method using an experience-oriented virtual baseball game apparatus that enables a user to practice baseball or play a baseball game with a virtual player in a virtual baseball image projected on a screen based on the virtual baseball image, the virtual baseball game control method including realizing an image for a baseball practice or a baseball game including a virtual batter and a virtual pitcher and displaying a strike zone having a plurality of partitioned regions in the image, sensing which of the partitioned regions of the strike zone a ball pitched by the user toward the screen reaches, realizing an image in which the pitched ball is determined to be a strike or the virtual batter swings and misses in the case in which the ball pitched by the user reaches one of the partitioned regions of the strike zone as the result of sensing performed by a sensor, specifying the region of the strike zone that the ball pitched by the user reaches as a danger region and displaying the danger region so as to be distinguished from other regions, and realizing an image in which the virtual batter performs one of making a hit and hitting a home run in the case in which the ball pitched by the user reaches the danger region as the result of sensing performed by the sensor.

In accordance with another aspect of the present invention, there is provided an experience-oriented virtual baseball game apparatus that enables a user to practice baseball or play a baseball game with a virtual player in a virtual baseball image projected on a screen based on the virtual baseball image, the apparatus including an image processor for realizing an image for a baseball practice or a baseball game including a virtual batter and a virtual pitcher, displaying a strike zone having a plurality of partitioned regions, and realizing an image in which the virtual batter performs an action as the user pitches a ball, a sensor for sensing which of the partitioned regions of the strike zone the ball pitched by the user reaches, and a controller for determining the ball pitched by the user to be a strike in the case in which the ball pitched by the user reaches one of the partitioned regions of the strike zone as the result of sensing performed by the sensor, performing control to specify at least one of the partitioned regions of the strike zone as an induction region and to display the induction region so as to be distinguished from other regions, and performing control to realize an image in which the virtual batter performs one of swinging and missing, grounding out, and flying out in the case in which the ball pitched by the user reaches the induction region as the result of sensing performed by the sensor.

In accordance with a further aspect of the present invention, there is provided an experience-oriented virtual baseball game apparatus that enables a user to practice baseball or play a baseball game with a virtual player in a virtual baseball image projected on a screen based on the virtual baseball image, the apparatus including an image processor for realizing an image for a baseball practice or a baseball game including a virtual batter and a virtual pitcher, displaying a strike zone having a plurality of partitioned regions, and realizing an image in which the virtual batter performs an action as the user pitches a ball, a sensor for sensing which of the partitioned regions of the strike zone the ball pitched by the user reaches, and a controller for determining the ball pitched by the user to be a strike in the case in which the ball pitched by the user reaches one of the partitioned regions of the strike zone as the result of sensing performed by the sensor, performing control such that the region of the strike zone that the ball pitched by the user reaches is displayed as a danger region so as to be distinguished from other regions, and performing control to realize an image in which the virtual batter performs one of fouling, making a hit, and hitting a home run in the case in which the ball pitched by the user reaches the danger region as the result of sensing performed by the sensor.

Advantageous Effects

The experience-oriented virtual baseball game apparatus according to the present invention and the virtual baseball game control method using the same have effects in that an induction region or a danger region is appropriately displayed in a strike zone displayed in an image when a user pitches a ball toward a screen, whereby the user experiences a very interesting war of nerves between a pitcher and a batter, for example, the case in which the user pitches a ball toward the screen in order to induce a virtual batter in the image to ground out or to fly out through the location of his/her pitch or the case in which the virtual batter makes a hit or hits a home run due to a careless pitch of the user.

BEST MODE

An experience-oriented virtual baseball game apparatus according to the present invention and a virtual baseball game control method using the same will be described in detail with reference to the accompanying drawings.

Figure 1:
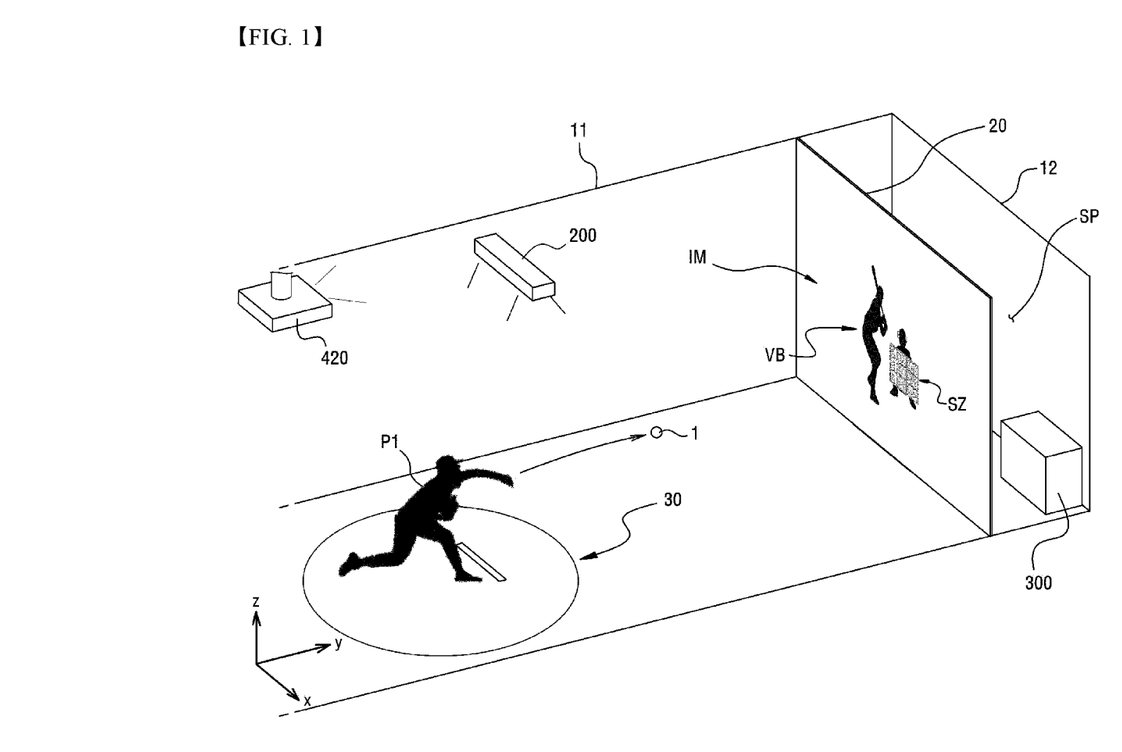
FIG. 1 is a view showing a so-called screen baseball system, which is an example of an experience-oriented virtual baseball game apparatus according to an embodiment of the present invention.
Figure 2:
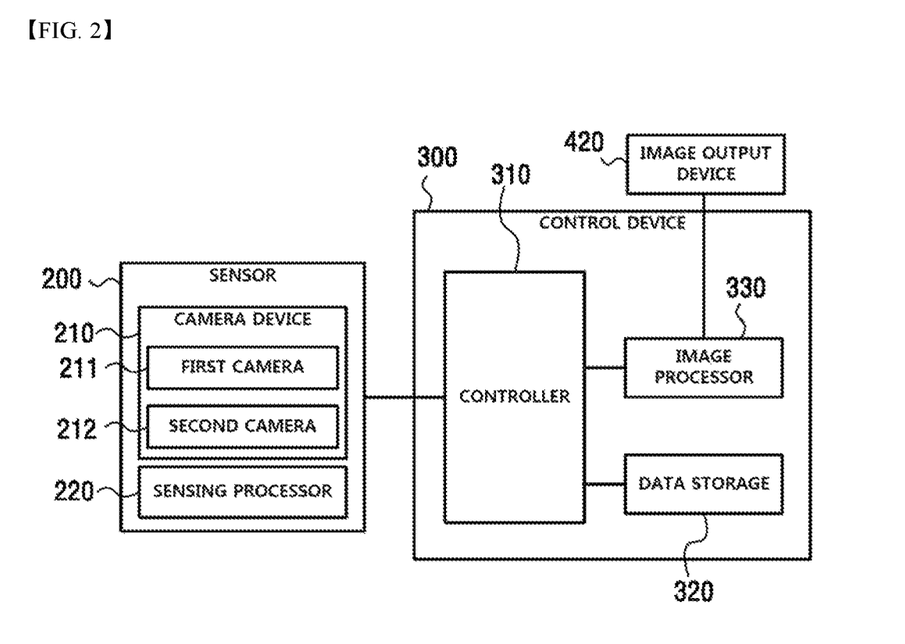
FIG. 2 is a block diagram showing the construction of the experience-oriented virtual baseball game apparatus shown in FIG. 1.

First, an experience-oriented virtual baseball game apparatus according to an embodiment of the present invention will be described with reference to FIGS. 1 and 2. FIG. 1 is a view showing a so-called screen baseball system, which is an example of an experience-oriented virtual baseball game apparatus according to an embodiment of the present invention, and FIG. 2 is a block diagram showing the construction of the experience-oriented virtual baseball game apparatus shown in FIG. 1.

As shown in FIG. 1, the experience-oriented virtual baseball game apparatus according to the embodiment of the present invention is configured such that a mound 30 and a screen 20 are provided in a space defined by a side wall 11 and a rear wall 12, and is configured such that a user P1 on the mound 30 can pitch a ball 1.

In the space SP between the screen 20 and the rear wall 12 may be provided a control device 300 for processing information about an image of a baseball stadium to be projected on the screen 20, an image of a virtual team playing an offensive position, and an image simulating a ball pitched or thrown by a user (the images processed by the control device 300 are projected on the screen 20 through an image output device 420).

Referring to FIG. 1, in an image IM projected on the screen 20, a virtual batter VB is ready to hit the ball pitched by the user P1, a virtual catcher VC is ready to catch the ball pitched by the user P1, and a strike zone SZ, based on which whether the pitched ball is a strike is determined, is displayed in front of the virtual catcher VC.

The ball 1 pitched by the user P1 is sensed using a sensor. Based on the result of sensing performed by the sensor, it is possible to determine whether the ball 1 pitched by the user P1 reaches the strike zone SZ or deviates from the strike zone SZ. Upon determining, based on the result of sensing performed by the sensor, that the ball 1 pitched by the user P1 reaches the strike zone SZ, the pitched ball may be recorded as a "strike" in a pitch count. Upon determining that the pitched ball 1 deviates from the strike zone SZ, the pitched ball may be recorded as a "ball" in the pitch count.

In the case in which the pitched ball 1 is located in the interior of the strike zone SZ, it is natural for the pitched ball to be recorded as a "strike." In the case in which the pitched ball 1 is located at the boundary of the strike zone SZ, however, a controller may determine that the pitched ball is a strike or a ball. This determination may be given based on a preset program installed in the controller according to game policy. For example, in the case in which the pitched ball reaches the boundary of the strike zone SZ and, at this time, the portion of the ball within the strike zone is larger than the portion of the ball deviating from the strike zone, the pitched ball may be determined to be a strike.

In the following description, "the pitched ball reaches the strike zone" may mean to include only the case in which the pitched ball reaches the interior of the strike zone, or may mean to include both the case in which the pitched ball reaches the interior of the strike zone and the case in which the pitched ball reaches the boundary of the strike zone while requirements based on a preset program are satisfied.

Meanwhile, the strike zone SZ has a plurality of partitioned regions, and some of the partitioned regions are displayed as induction regions or danger regions, which will be described below. Different specific situations may occur depending on the case in which the ball pitched by the user reaches the partitioned regions, the case in which the ball pitched by the user reaches the induction regions, and the case in which the ball pitched by the user reaches the danger regions.

Meanwhile, the control system of the experience-oriented virtual baseball game apparatus according to the embodiment of the present invention may be configured as follows. As shown in FIGS. 1 and 2, the virtual baseball game apparatus according to the embodiment of the present invention may include a control device 300 and a sensor 200.

The sensor 200 may be realized by infrared sensors arranged in a matrix form, which may be installed along the path along which the ball pitched by the user travels in order to sense information about the speed of the ball pitched by the user and the trajectory of the pitched ball, or may be realized by pressure sensors, which may be installed behind the screen in order to sense the position of the ball pitched by the user based on the sensed pressure at which the ball reaches a certain portion of the strike zone.

However, there are limitations in acquiring accurate information about the motion of the pitched ball using the infrared sensors or the pressure sensors, and in the case in which the sensors are installed on the screen, the sensors may be damaged, which is undesirable.

In the baseball game apparatus according to the embodiment of the present invention, as shown in FIGS. 1 and 2, the sensor may be realized by a camera sensing type sensing device, which continuously captures images of the ball pitched by the user and analyzes the captured images in order to accurately sense information about the motion of the pitched ball and the position of the strike zone displayed in the image projected on the screen where the pitched ball reaches.

In the following description, the sensor is realized by camera sensing type sensing device described above.

As shown in FIGS. 1 and 2, the sensor 200 analyzes the captured images in order to sense an object in the images. The sensor acquires and analyzes images of a predetermined capture range including the mound 30 in order to calculate information about the motion of a ball that is pitched by a user and a ball that the user throws to a throwing area and to calculate information about the time at which the ball pitched or thrown by the user reaches the screen and the position of the screen that the ball reaches using the calculated information about the motion of the ball.

As shown in FIG. 2, the sensor 200 may include a camera device 210 and a sensing processor 220. The camera device 210 continuously acquires images of a predetermined capture range including the mound 30, and the sensing processor 220 analyzes the images received from the camera device 210 according to predetermined criteria in order to calculate information necessary for a baseball practice or a baseball game using the baseball game apparatus according to the embodiment of the present invention.

The camera device 210 of the sensor 200 may include a first camera 211 and a second camera 212, which capture images of the same image-capture range from different positions, i.e. stereoscopic images, in order to calculate three-dimensional position information of an object in the captured images such that the sensing processor 220 analyses the images captured by the camera device 210 in order to acquire three-dimensional coordinate data of a ball.

The sensing processor 220 receives and collects the captured images from the first camera 211 and the second camera 212 of the camera device 210, analyzes the collected images to extract three-dimensional coordinate data of the ball in the images, determines a motion model of a pitched ball or a hit ball using the extracted three-dimensional coordinate data, and calculates, using the determined ball motion model, various kinds of information necessary for a baseball practice or a baseball game using the experience-oriented virtual baseball game apparatus according to the present invention.

Here, the ball motion model may be expressed by a motion equation describing the trajectory of a ball that is pitched by a user in a three-dimensional space. As shown in FIG. 1, a space in which a baseball practice or a baseball game using the experience-oriented virtual baseball game apparatus according to the present invention is performed may be defined based on a three-dimensional coordinate system including an x-axis, a y-axis, and a z-axis such that the ball motion model can be determined based on the defined coordinate system.

That is, the ball motion model may be defined by a motion equation in the x-axis direction, a motion equation in the y-axis direction, and a motion equation in the z-axis direction.

The sensor 200 may calculate the ball motion information and transmit the calculated ball motion information to the control device 300. The control device 300 may realize an image simulating the ball motion based on the received ball motion information and project the realized simulation image on the screen 20 through the image output device 420.

Meanwhile, as shown in FIG. 2, the control device 300 may include a data storage 320, an image processor 330, and a controller 310.

The data storage 320 is a unit that stores data for processing a baseball simulation image in the experience-oriented virtual baseball game apparatus. For example, the data storage may store hitting data about hitting records of a virtual batter. The data storage 320 may be configured to serve as a storage space for temporarily storing data received from a server (not shown).

The image processor 330 processes the image data according to a preset program in order to generate various kinds of baseball-simulation-related images including a background image such as an image of a virtual baseball stadium and images of players, umpires, spectators, and the like, an image of a virtual catcher, a virtual batter, and a virtual umpire waiting for a ball that is pitched by the user, and an image simulating the trajectory of the ball pitched by the user. The processed images are transmitted to the image output device 420. The image output device 420 projects the received images on the screen 20 such that the user can see the images.

The controller 310 controls each component of the virtual baseball game apparatus according to the present invention and performs various operations for realizing a baseball simulation image, such as an image simulating the trajectory of a ball, based on various kinds of information received from the sensor 200.

Meanwhile, in the virtual baseball game apparatus according to the present invention, as shown in FIG. 1, when the user P1 on the mound 30 pitches a ball 1, the ball moves toward the virtual catcher VC in the image IM projected on the screen 20 based on sensing information obtained as the result of the sensor 200 sensing the pitched ball. At this time, the virtual batter VB in the image IM may or may not swing for a virtual ball based on the ball pitched by the user. In addition, the virtual batter may swing and hit the virtual ball, or may swing and miss.

The control device of the virtual baseball game apparatus according to the present invention performs an image realization operation such that the virtual batter VB hits, swings and misses, or does not swing for the virtual ball based on the ball pitched by the user, as described above. At this time, the action of the virtual batter VB may be performed based on predetermined artificial intelligence (AI) (artificial intelligence for game characters).

Figure 3:
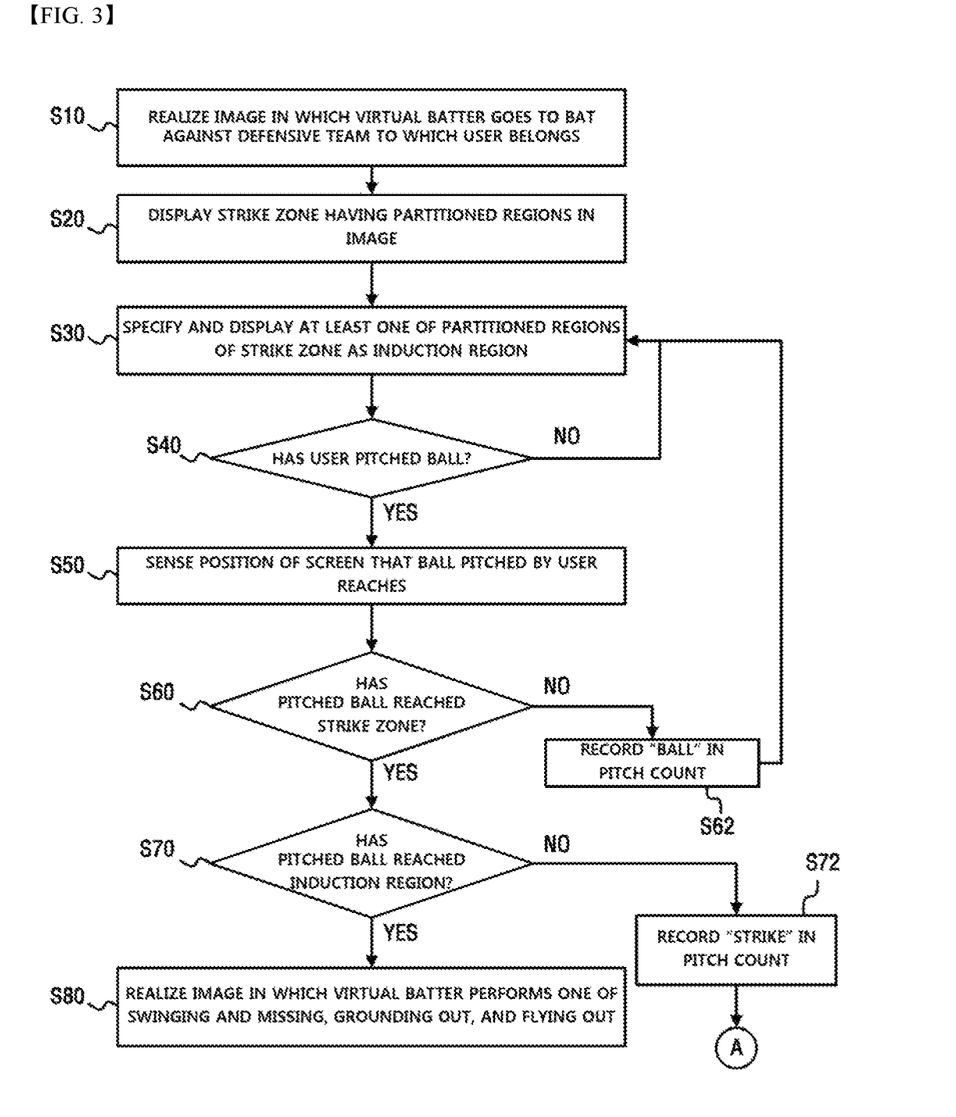
FIG. 3 is a flowchart showing a virtual baseball game control method according to an embodiment of the present invention.

Hereinafter, a virtual baseball game control method using the experience-oriented virtual baseball game apparatus according to the embodiment of the present invention will be described with reference to FIG. 3. FIG. 3 is a flowchart showing a virtual baseball game control method according to an embodiment of the present invention.

As shown in FIG. 3, the controller controls the image processor to realize an image in which a virtual baseball game starts in the state in which a user plays a defensive position and a virtual batter plays an offensive position and in which the virtual batter goes to bat against a defensive team to which the user belongs (S10).

For example, an image in which a virtual catcher in the defensive team is ready to catch a ball and a virtual batter in an offensive team is ready to hit a ball in a batter's box may be realized.

The controller performs control such that a strike zone is displayed in the image together with the virtual catcher. The strike zone is provided for the controller to determine whether the ball pitched by the user is a "strike" or a "ball" based on the result of sensing performed by the sensor. The strike zone is displayed so as to have a plurality of partitioned regions (S20). The strike zone is displayed so as to have nine partitioned regions, in the same manner as the strike zone SZ shown in FIG. 1.

In addition, the controller may specify at least one of the partitioned regions of the strike zone as an induction region, and may control the image processor such that at least one partitioned region of the strike zone is distinguished from the other partitioned regions (for example, such that at least one partitioned region of the strike zone has a different color than the other partitioned regions) in the image (S30).

In the case in which the ball pitched by the user reaches the induction region, the controller may perform setting such that the virtual batter swings and misses, grounds out, or flies out, which will be described below in more detail.

In the case in which the user pitches an actual ball while looking at the strike zone realized in the image in the state in which the virtual catcher, the virtual batter, and the strike zone are realized in the image, as described above, the sensor may sense the pitching of the user in order to determine whether the user has pitched the ball (S40).

Subsequently, the sensor may sense the position of the screen that the ball pitched by the user reached (S50), and the controller may determine whether the ball pitched by the user reached the strike zone or deviated from the strike zone based on the result of sensing performed by the sensor (S60).

Upon determining that the ball pitched by the user deviated from the strike zone, the controller may perform control such that the pitched ball is recorded as a "ball" in a pitch count for the virtual batter (S62).

Upon determining that the ball pitched by the user reached the strike zone, the controller may calculate information about the position coordinates of the pitched ball based on the result of sensing performed by the sensor, and may determine whether the pitched ball reached the induction region, among the partitioned regions of the strike zone, based on the calculation (S70).

Upon determining that the ball pitched by the user reached the induction region of the strike zone, the controller may realize an image in which the virtual batter performs one of swinging and missing, grounding out, and flying out based on criteria preset for the case in which the ball reaches the induction region, as described above (S80).

Upon determining that the ball pitched by the user reached one of the partitioned regions of the strike zone other than the induction region, the virtual batter swings and misses or does not swing, and therefore the pitched ball is recorded as a "strike" in the pitch count (S72). From the next pitch of the user, step A after step S72 is performed, for example, the region that the ball reached is displayed as a danger region, which will be described below with reference to FIGS. 5 to 7.

Hereinafter, steps S10 to S80 shown in FIG. 3 will be described in more detail with reference to FIG. 4.

Figure 4:
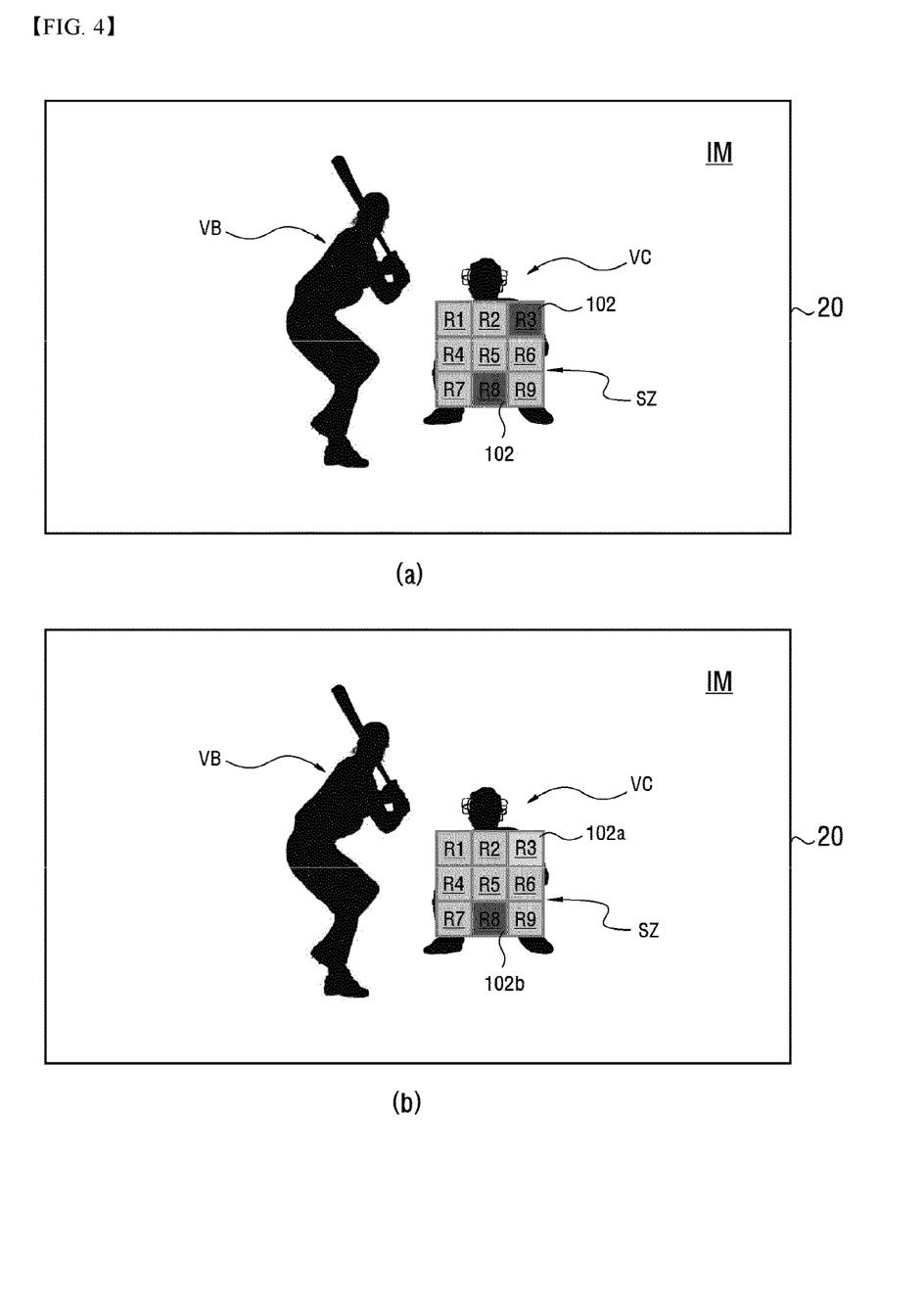
FIG. 4 illustrates (a) and (b) showing examples of images projected on a screen of the virtual baseball game apparatus according to the embodiment of the present invention.

FIGS. 4(*a*) and 4(*b*) are views showing examples of images projected on the screen 20 of the virtual baseball game apparatus according to the embodiment of the present invention, specifically images seen in the direction in which the user looks when the user pitches a ball toward the screen 20.

FIG. 4(*a*) shows the state in which a strike zone SZ is displayed in an image in which a virtual batter VB plays an offensive position and a virtual catcher VC catches a ball according to steps S10, S20, and S30 shown in FIG. 3. The strike zone SZ has nine partitioned regions R1 to R9.

As shown in FIG. 4(*a*), the controller of the virtual baseball game apparatus according to the embodiment of the present invention may designate region R3 and region R8, among the partitioned regions R1 to R9 of the strike zone SZ, as induction regions 102, and may perform control such that the region R3 and region R8 are displayed in a color different from the color of the other regions R1, R2, R4, R5, R6, R7, and R9. In addition to the color, the induction regions may blink or vary in brightness so as to be distinguished from the other regions.

In this embodiment, the strike zone is described so as to have nine partitioned regions. However, the present invention is not limited thereto. For example, the strike zone may be partitioned into two or more regions.

A user who is to pitch a ball toward the screen may pitch the ball aiming at one of region R3 and region R8, which are the induction regions, such that the virtual batter VB swings and misses, grounds out, or flies out.

That is, the virtual baseball game apparatus according to the embodiment of the present invention enables the user to locate his/her pitch such that a ball reaches region R3 or region R8, which is the induction region, such that the user takes pleasure in inducing an actual batter to swing and miss, to ground out, or to fly out when pitching the ball. In other words, the virtual baseball game apparatus according to the embodiment of the present invention enables the user to take pleasure in locating his/her pitch and to take pleasure in inducing the virtual batter to swing and miss, to ground out, or to fly out when the user successfully locates his/her pitch in the same manner as in an actual baseball game.

The controller may preset the number of partitioned regions R1 to R9 of the strike zone specified as the induction regions and the position of partitioned regions of the strike zone specified as the induction regions.

For example, the controller may randomly set the number of induction regions within a predetermined numeric range, and may randomly set the position of partitioned regions R1 to R9 specified as the induction regions.

In addition, the controller may extract hitting data of a virtual batter who is ready to hit a ball from the data storage and analyze the extracted data in order to specify the position of the induction regions among the partitioned regions.

For example, in the case in which the controller extracts data, such as hitting records, of a virtual batter who is ready to hit a ball from the data storage, analyzes the extracted data, and determines that the virtual batter frequently grounds out for lower middle pitches, the controller may specify the lower middle one of the partitioned regions R1 to R9, i.e. region R8, as an induction region. In this case, the number of induction regions may be randomly set, as described above, or may be fixed.

In addition, the controller may preset the probability of the virtual batter swinging and missing for the induction region, the probability of the virtual batter grounding out for the induction region, and the probability of the virtual batter flying out for the induction region. Only one or two of the probability of swinging and missing, the probability of grounding out, and the probability of flying out may be set.

For example, the controller may perform presetting such that the probability of grounding out for the induction region is 60% and the probability of flying out for the induction region is 70%. Of course, the probability of 0% or the probability of 100% may also be set.

In addition, the controller may perform presetting such that the above-described probabilities are changed depending on the position of the induction region.

That is, setting may be possible such that the probability of grounding out is higher in the case in which the position of the induction region of the strike zone is lower and such that the probability of flying out is higher in the case in which the position of the induction region of the strike zone is higher.

For example, in the case in which regions R1 to R3 of the strike zone SZ shown in FIG. 4(a), which are regions having the highest positions, are specified as induction regions, the probability of flying out may be preset to 70%, the probability of grounding out may be preset to 30%, and the probability of swinging and missing may be preset to 50%. In the case in which regions R7 to R9 of the strike zone SZ shown in FIG. 4(a), which are regions having the lowest positions, are specified as induction regions, the probability of grounding out may be preset to 90%, and the probability of flying out may be preset to 30%.

In addition, the controller may preset the ability value of each virtual player that is capable of playing a game before starting the game, may calculate the probability of the virtual batter swinging and missing, the probability of the virtual batter grounding out, and the probability of the virtual batter flying out based on the ability value preset for the virtual batter, and may set the calculated probabilities for the induction regions, instead of presetting the probability of the virtual batter performing at least one of swinging and missing, grounding out, and flying out for the induction regions described above.

In addition, the controller may determine the number and position of induction regions to be displayed in the strike zone based on the predetermined ability value of the virtual player. For example, the controller may perform control such that the number of induction regions to be displayed is further increased in the case in which the ability value of the virtual player is lower and such that those of the partitioned regions of the strike zone toward which it is easy for the user to pitch a ball are displayed as the induction regions. On the other hand, the controller may perform control such that the number of induction regions to be displayed is further decreased in the case in which the ability value of the virtual player is higher and such that those of the partitioned regions of the strike zone toward which it is difficult for the user to pitch a ball are displayed as the induction regions.

Meanwhile, the controller may perform control such that the induction regions 102 described above are divided into a swinging-and-missing induction region and an out induction region and such that both the swinging-and-missing induction region and the out induction region are displayed or only one of the swinging-and-missing induction region and the out induction region is displayed. FIG. 4(b) shows the case in which region R3 of the strike zone SZ is set and displayed as a swinging-and-missing induction region 102a, region R8 of the strike zone SZ is set and displayed as an out induction region 102b, and the swinging-and-missing induction region 102a and the out induction region 102b are displayed in different colors so as to be distinguished from each other.

The controller may perform control such that an image of the virtual batter swinging and missing is realized in the case in which the ball pitched by the user reaches the swinging-and-missing induction region 102a and such that an image of the virtual batter hitting the ball and grounding out or flying out is realized in the case in which the ball pitched by the user reaches the out induction region 102b.

In the state in which the swinging-and-missing induction region 102a and the out induction region 102b are displayed in the strike zone SZ, as shown in FIG. 4(b), the user may pitch a ball toward the swinging-and-missing induction region 102a in order to induce the virtual batter to swing and miss and thus to strike out, or may pitch a ball toward the out induction region 102b in order to induce the virtual batter to ground out or fly out. Consequently, the present invention is capable of stimulating the user to be interested in pitching through successful location of his/her pitch, unlike the related art.

The controller may perform control such that the number of swinging-and-missing induction regions 102a and out induction regions 102b is randomly set, such that the swinging-and-missing induction region 102a and the out induction region 102b are displayed at randomly determined positions, and such that the swinging-and-missing induction region 102a and the out induction region 102b are determined based on hitting data of the current virtual batter in the batter's box, in the same manner as in the induction regions.

In addition, the probability of swinging and missing, grounding out, or flying out may be preset for each of the swinging-and-missing induction region 102a and the out induction region 102b, may be calculated based on the ability value of the virtual batter in a predetermined manner, or may be changed depending on the position of the region in the strike zone, as described above.

Figure 5:
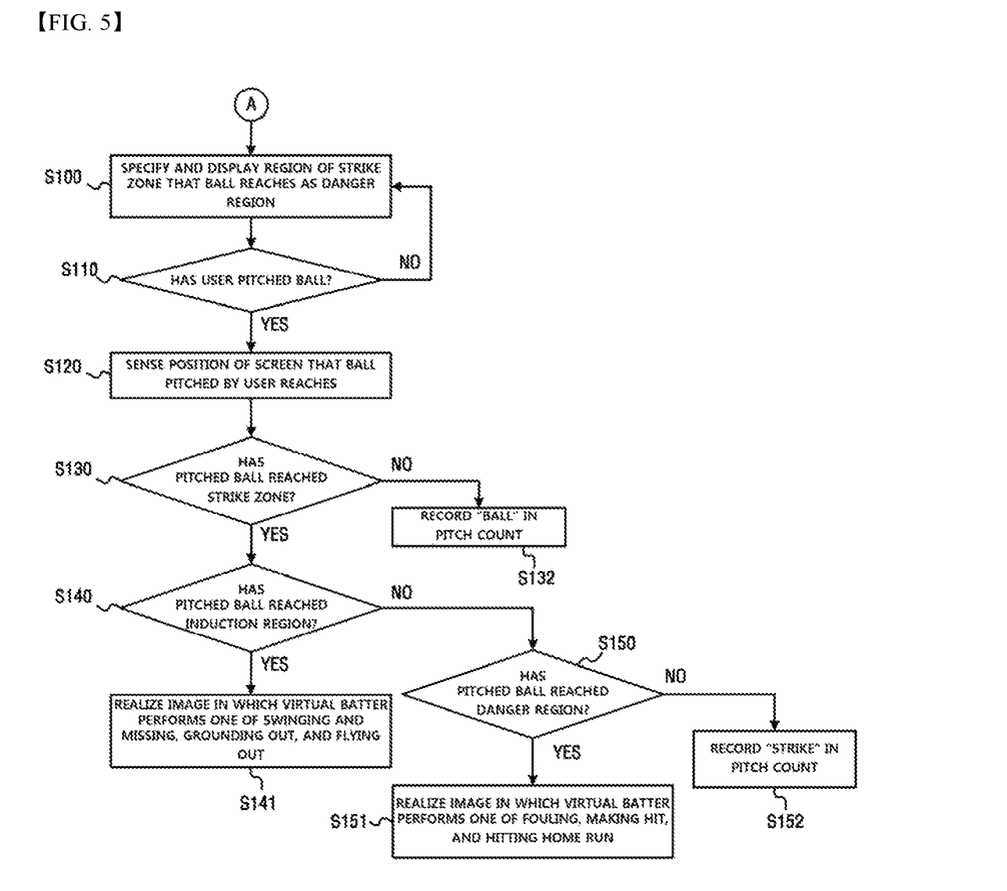
FIG. 5 is a flowchart, connected to the flowchart of FIG. 3, showing the virtual baseball game control method according to the present invention.

Hereinafter, step A, which may be performed after step S72 of the flowchart shown in FIG. 3, will be described with reference to FIGS. 5 to 7.

First, a virtual baseball game control method using a virtual baseball game apparatus according to another embodiment of the present invention will be described with reference to the flowchart shown in FIG. 5.

In the case in which the ball pitched by the user does not reach the induction region in the strike zone but reaches one of the other partitioned regions, the controller performs control to specify and display the region of the strike zone that the ball pitched by the user reaches as a danger region (S100).

In the case in which the danger region is displayed, as described above, the controller performs setting such that the virtual batter fouls, makes a hit, or hits a home run upon determining, based on the result of sensing performed by the sensor, that the next ball pitched by the user reaches the danger region.

In the case in which the pitching of the user is sensed (S110) after the danger region is displayed in the strike zone, as described above, the sensor senses the position of the screen that the ball pitched by the user reached (S120), and the controller determines, based on the result of sensing performed by the sensor, whether the ball pitched by the user reached the strike zone (S130).

Upon determining that the ball pitched by the user deviated from the strike zone, the controller performs control such that the pitched ball is recorded as a "ball" in a pitch count of the virtual batter (S132).

Upon determining that the ball pitched by the user reached the strike zone, the controller may calculate information about the position coordinates of the pitched ball based on the result of sensing performed by the sensor, and may determine whether the pitched ball reached the induction region, among the partitioned regions of the strike zone, based on the calculation (S140).

Upon determining that the ball pitched by the user reached the induction region of the strike zone, the controller may realize an image in which the virtual batter performs one of swinging and missing, grounding out, and flying out based on criteria preset for the case in which the ball reaches the induction region (S141).

Upon determining that the ball pitched by the user reached the danger region of the strike zone (S150), the controller may realize an image in which the virtual batter performs one of fouling, making a hit, and hitting a home run based on criteria preset for the case in which the ball reaches the danger region (S151).

Upon determining that the ball pitched by the user reached one of the partitioned regions of the strike zone other than the induction region and the danger region, the virtual batter swings and misses or does not swing, and therefore the pitched ball is recorded as a "strike" in the pitch count (S152).

Hereinafter, the virtual baseball game control method according to the flowchart shown in FIG. 5 will be described in more detail with reference to FIG. 6.

Figure 6:
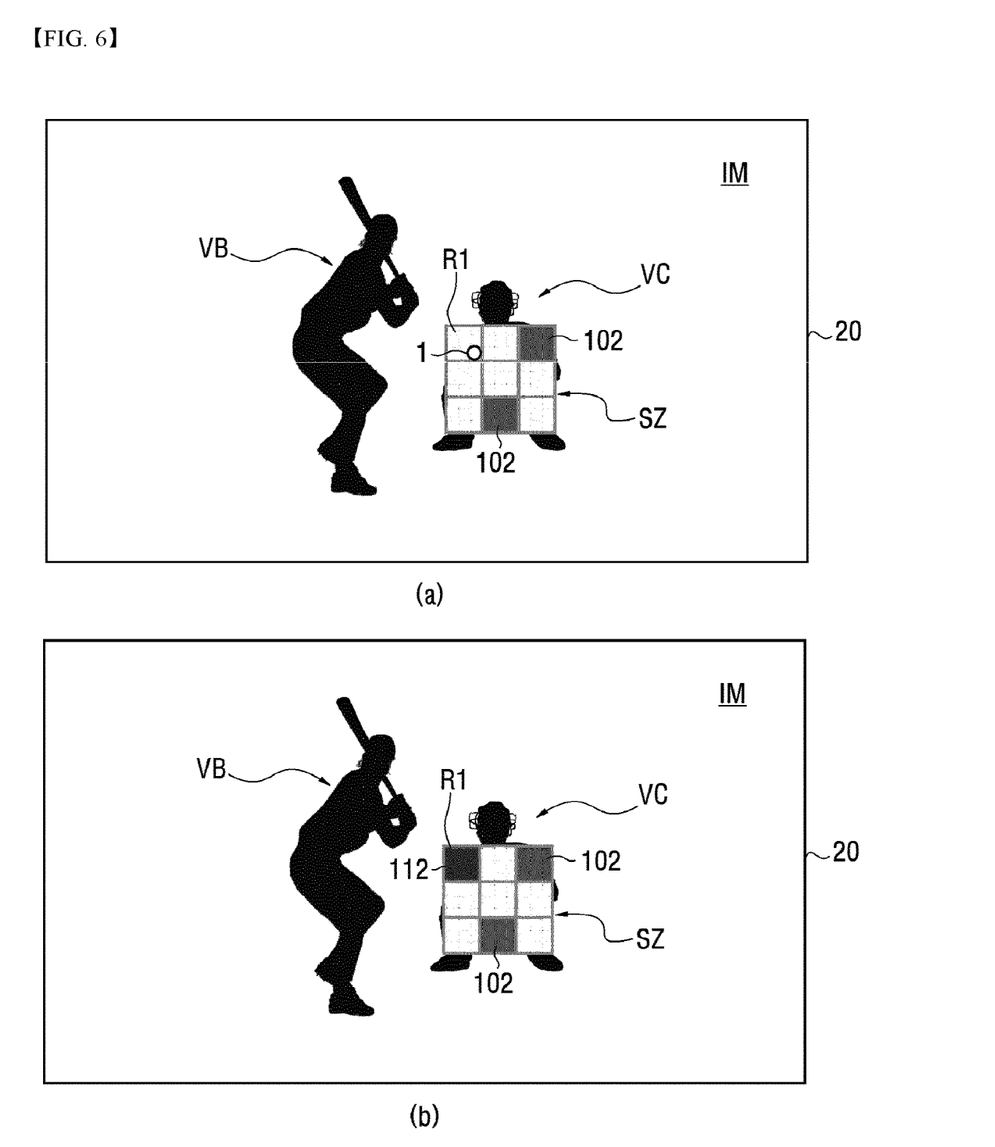
FIG. 6 illustrates (a) and (b) showing examples of images projected on a screen of a virtual baseball game apparatus according to another embodiment of the present invention.

FIGS. 6(a) and 6(b) are views showing examples of images projected on a screen 20 of a virtual baseball game apparatus according to another embodiment of the present invention, specifically images seen in the direction in which the user looks when the user pitches a ball toward the screen 20. The image shown in FIG. 6(b) is realized after the image shown in FIG. 6(a).

As shown in FIG. 6(a), a strike zone SZ is displayed in an image in which a virtual batter VB plays an offensive position and a virtual catcher VC catches a ball. Although a plurality of partitioned regions in the strike zone SZ is not designated in the figure, the strike zone SZ has nine partitioned regions R1 to R9, in the same manner as the strike zone SZ shown in FIGS. 4(a) and 4(b).

The controller performs control such that specific partitioned regions of the strike zone SZ are displayed as induction regions 102 according to the criteria for the induction regions described above. The induction regions have been sufficiently described above, and therefore a detailed description thereof will be omitted below.

As shown in FIG. 6(a), in the case in which the user pitched a ball and the pitched ball 1 reached region R1 of the strike zone, the controller may perform control such that an image in which the virtual batter VB swings and misses or does not swing is realized, whereby the pitched ball is recorded as a "strike" in a pitch count.

When the user pitches the next ball after the above pitch of the user, the controller specifies region R1 of the strike zone SZ as a danger region 112 so as to be displayed in a color different from the color of the other regions, as shown in FIG. 6(b).

At this time, the controller may perform setting such that the virtual batter fouls, makes a hit, or hits a home run for the danger region 112. In the case in which the ball pitched by the user reached the danger region 112 in the state shown in FIG. 6(b), the controller performs control such that an image in which the virtual batter fouls, makes a hit, or hits a home run is realized according to the criteria set for the danger region.

In addition, the controller may preset the probability of fouling, the probability of making a hit, and the probability of hitting a home run for the danger region. Only one or two of the probability of fouling, the probability of making a hit, and the probability of hitting a home run may be set.

For example, the controller may perform presetting such that the probability of making a hit for the danger region is 60% and the probability of hitting a home run for the danger region is 30%. Of course, the probability of 0% or the probability of 100% may also be set.

When setting the probability of making a hit, the controller may individually set the probability of making a one-base hit, the probability of making a two-base hit, and the probability of making a three-base hit.

In addition, the above-described probabilities for the danger region may be set based on hitting data of the virtual batter.

For example, in the case in which the number of home run records is relatively large as the result of analyzing the hitting data of the virtual batter, the controller may set the probability of hitting a home run so as to be higher than the probability of making a hit for the danger region. In the case in which the number of one-base hit records is relatively large as the result of analyzing the hitting data of the virtual batter, the controller may set the probability of making a one-base hit so as to be the highest, and may set the probability of making a two-base hit, the probability of making a three-base hit, and the probability of hitting a home run based on the hitting data or randomly.

Meanwhile, the controller may set the above-described probabilities differently depending on the position of the danger region in the strike zone.

That is, the controller may perform setting such that the probability of making a hit is further increased in the case in which the position of the danger region in the strike zone is lower and such that the probability of hitting a home run is further increased in the case in which the position of the danger region in the strike zone is higher.

For example, in the case in which one of the lowest partitioned regions of the strike zone SZ shown in FIG. 6(b) is set as a danger region, the controller may perform setting such that the probability of making a one-base hit is 80%, the probability of making a two-base hit is 60%, the probability of making a three-base hit is 30%, and the probability of hitting a home run is 5%. In the case in which one of the highest partitioned regions of the strike zone is set as a danger region, the controller may perform setting such that the probability of making a one-base hit is 70%, the probability of making a two-base hit is 70%, the probability of making a three-base hit is 50%, and the probability of hitting a home run is 30%.

In addition, the controller may preset the ability value of each virtual player that is capable of playing a game before starting the game, may calculate the probability of the virtual batter making a hit and the probability of the virtual batter hitting a home run based on the ability value preset for the virtual batter, and may set the calculated probabilities for the danger region, instead of presetting the probability of the virtual batter making a hit and the probability of the virtual batter hitting a home run for the danger region described above.

The user may pitch a ball in consideration of the fact that, in the case in which he/she repeatedly pitches balls toward the same position, the batter becomes accustomed to his/her pitching and thus may make a hit or may hit a home run. Consequently, the user may experience various situations, such as a war of nerves between the pitcher and the batter and the batter making a hit or hitting a home run due to a careless pitch of the pitcher, through the virtual baseball game apparatus according to the present invention, in the same manner as in an actual baseball game.

Meanwhile, since making a hit or hitting a home run may occur probabilistically even after the region that the user has pitched the ball once is set as a danger region, as described above, making a hit or hitting a home run may not occur even in the case in which the next ball pitched by the user reaches the danger region.

In this case, the controller may perform control such that the probability of making a hit or hitting a home run previously set for the danger region is further increased in order to display that the danger region becomes more dangerous (the color of the danger region may be further deepened, or the danger region may blink or vary in brightness).

This will be described with reference to FIG. 7.

Figure 7:
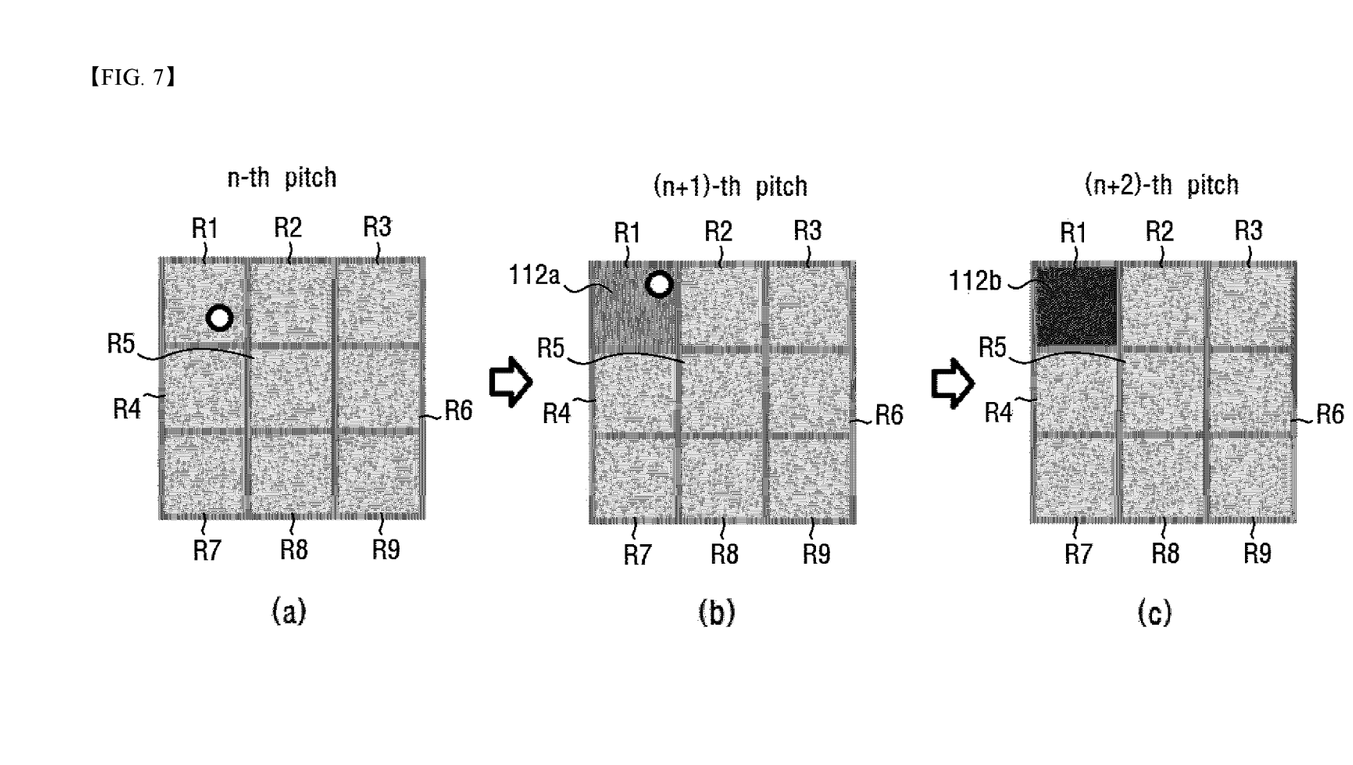
FIG. 7 illustrates (a) to (c) showing that a strike zone in an image is changed depending on the pitching order of a user in order to illustrate a danger region in a virtual baseball game apparatus according to a further embodiment of the present invention.

FIGS. 7(a) to 7(c) show only a strike zone in an image. FIG. 7(a) shows the strike zone at the time of an n-th pitch of the user, FIG. 7(b) shows the strike zone at the time of an (n+1)-th pitch of the user, and FIG. 7(c) shows the strike zone at the time of an (n+2)-th pitch of the user. Here, n is a natural number (n=1, 2, 3 . . . ).

In the case in which the pitched ball 1 reached region R1 as the result of n-th pitching of the user in the state in which a strike zone having a plurality of partitioned regions R1 to R9, as shown in FIG. 7(a), is displayed in an image, the virtual batter may swing and miss or may not swing, and the pitched ball is recorded as a "strike."

At this time, the controller sets region R1 as a primarily danger region 112a, sets the probability of fouling, making a hit, or hitting a home run for the set region, and performs control such that region R1 is displayed in a predetermined color so as to be distinguished from the other regions R2 to R9 at the time of the (n+1)-th pitch of the user, as shown in FIG. 7(b).

In the case in which the pitched ball 1 reached the primarily danger region 112a as the result of the (n+1)-th pitch of the user, as shown in FIG. 7(b), the controller performs control such that an image in which the virtual batter acts based on the probability set for the region is realized.

In the case in which the virtual batter did not hit a ball moving toward the primarily danger region 112a or fouled, the control may set the primarily danger region, i.e. region R1, as a secondarily danger region 112b, and may further increase the probability of making a hit or hitting a home run set previously for the region (it is possible to apply a numerical value preset as a higher probability).

At the time of (n+2)-th pitching of the user, as shown in FIG. 7(c), the controller may perform control such that region R1 is further distinguished from the previous state thereof, for example, region R1 is displayed in a color that is deeper than the previous color in order to display that the region becomes more dangerous.

In the case in which the user pitched a ball toward the secondarily danger region 112b, an image in which the virtual batter makes a hit or hits a home run with higher probability may be realized.

As is apparent from the above description, the virtual baseball game apparatus according to the present invention and the virtual baseball game control method using the same enable the user to take pleasure in locating his/her pitch and to take pleasure in inducing the virtual batter to swing and miss, to ground out, or to fly out when the user successfully locates his/her pitch in the same manner as in an actual baseball game. In addition, the user may pitch a ball in consideration of the fact that, in the case in which he/she repeatedly pitches toward the same position, the batter becomes accustomed to his/her pitching and thus may make a hit or may hit a home run. Consequently, the user may experience a war of nerves between the pitcher and the batter in the same manner as in an actual baseball game.

INDUSTRIAL APPLICABILITY

The experience-oriented virtual baseball game apparatus according to the present invention and the virtual baseball game control method using the same are industrially applicable in a technical field that allows a user to practice baseball or to play a virtual baseball game in such a manner that the user pitches a ball toward a virtual batter realized as an image on a screen installed in front of the user in an indoor space of a predetermined size and in such a manner that the sensing device senses the pitched ball and realizes a simulation image on the screen.

The invention claimed is:
1. A virtual baseball game control method using an experience-oriented virtual baseball game apparatus that enables a user to practice baseball or play a baseball game with a virtual player in a virtual baseball image projected on a screen based on the virtual baseball image, the virtual baseball game control method comprising:
  realizing an image for a baseball practice or a baseball game comprising a virtual batter and a virtual pitcher and displaying a strike zone having a plurality of partitioned regions in the image;

specifying at least one of the partitioned regions of the strike zone as an induction region and displaying the induction region so as to be distinguished from other regions;
capturing images of the ball pitched by the user toward the screen;
analyzing the captured images so as to detect coordinate data of the pitched ball in a three-dimensional space from each of the captured images;
determining a ball motion model using the detected coordinate data of the pitched ball;
calculating a position on the screen that the pitched ball reaches using the determined ball motion model;
sensing which of the partitioned regions of the strike zone the pitched ball toward the screen reaches using the calculated position on the screen; and
realizing an image in which the virtual batter performs one of swinging and missing, grounding out, and flying out in a case in which the ball pitched by the user reaches the induction region as a result of sensing performed by a sensor.

2. The virtual baseball game control method according to claim 1, wherein the step of specifying an induction region and displaying the induction region so as to be distinguished from the other regions comprises specifying a random number of the partitioned regions of the strike zone that are randomly selected within a predetermined numeric range as the induction regions.

3. The virtual baseball game control method according to claim 1, wherein the step of specifying an induction region and displaying the induction region so as to be distinguished from the other regions comprises:
extracting hitting data of the virtual batter from a data storage for storing hitting data of each virtual player; and
specifying at least one of the partitioned regions of the strike zone as the induction region based on the extracted hitting data and displaying the induction region.

4. The virtual baseball game control method according to claim 1, wherein
the virtual baseball game apparatus is configured to preset, as the induction region, at least one of a swinging-and-missing induction region, configured such that an image in which the virtual batter swings and misses is realized when the ball pitched by the user reaches the swinging-and-missing induction region as the result of sensing performed by the sensor, and an out induction region, configured such that an image in which the virtual batter grounds out or flies out is realized when the ball pitched by the user reaches the out induction region as the result of sensing performed by the sensor, and
the step of specifying an induction region and displaying the induction region so as to be distinguished from the other regions comprises displaying some of the partitioned regions of the strike zone as at least one of the swinging-and-missing induction region and the out induction region according to criteria preset for the induction region.

5. The virtual baseball game control method according to claim 1, wherein the step of realizing an image comprises realizing an image in which the virtual batter performs at least one of swinging and missing, grounding out, and flying out according to a predetermined probability of the virtual batter performing at least one of swinging and missing, grounding out, and flying out or a probability set based on hitting data of the virtual batter extracted from a data storage for storing hitting data of each virtual player in a case in which the ball pitched by the user reaches the induction region as the result of sensing performed by the sensor.

6. The virtual baseball game control method according to claim 1, wherein
the experience-oriented virtual baseball game apparatus presets a hitting ability value of each virtual player that is capable of playing the game, and
the step of specifying an induction region and displaying the induction region so as to be distinguished from the other regions comprises determining at least one of a number of induction regions to be displayed in the strike zone and positions of the induction regions based on the hitting ability value preset for the virtual batter.

7. The virtual baseball game control method according to claim 1, wherein
the experience-oriented virtual baseball game apparatus presets a hitting ability value of each virtual player that is capable of playing the game,
the step of specifying an induction region and displaying the induction region so as to be distinguished from the other regions comprises calculating and setting a probability of the virtual batter performing at least one of swinging and missing, grounding out, and flying out based on the hitting ability value preset for the virtual batter when the ball pitched by the user reaches the induction region as the induction region is specified and displayed, and
the step of realizing an image comprises at least one of the virtual batter swinging and missing, grounding out, and flying out occurring according to the probability set for the induction region in the case in which the ball pitched by the user reaches the induction region as the result of sensing performed by the sensor.

8. The virtual baseball game control method according to claim 1, further comprising:
determining that the ball pitched by the user reaches one of the partitioned regions of the strike zone other than the induction region as the result of sensing performed by the sensor;
realizing an image in which the pitched ball is determined to be a strike or the virtual batter swings and misses according to reaching of the ball;
specifying the region of the strike zone that the ball reaches as a danger region and displaying the danger region so as to be distinguished from other regions; and
realizing an image in which the virtual batter performs one of fouling, making a hit, and hitting a home run upon determining that a next ball pitched by the user reaches the danger region as the result of sensing performed by the sensor.

9. An experience-oriented virtual baseball game apparatus that enables a user to practice baseball or play a baseball game with a virtual player in a virtual baseball image projected on a screen based on the virtual baseball image, the apparatus comprising:
an image processor for realizing an image for a baseball practice or a baseball game comprising a virtual batter and a virtual pitcher, displaying a strike zone having a plurality of partitioned regions, and realizing an image in which the virtual batter performs an action as the user pitches a ball;
a sensor configured for:
capturing images of the ball pitched by the user toward the screen, analyzing the captured images so as to detect coordinate data of the pitched ball in a three-dimensional space from each of the captured images,
determining a ball motion model using the detected coordinate data of the pitched ball,
calculating a position on the screen that the pitched ball reaches using the determined ball motion model, and
sensing which of the partitioned regions of the strike zone the pitched ball toward the screen reaches using the calculated position on the screen; and
a controller for determining the ball pitched by the user to be a strike in a case in which the ball pitched by the user reaches one of the partitioned regions of the strike zone as a result of sensing performed by the sensor, performing control to specify at least one of the partitioned regions of the strike zone as an induction region and to display the induction region so as to be distinguished from other regions, and performing control to realize an image in which the virtual batter performs one of swinging and missing, grounding out, and flying out in a case in which the ball pitched by the user reaches the induction region as the result of sensing performed by the sensor.

10. The apparatus according to claim 9, wherein the controller presets, as the induction region, at least one of a swinging-and-missing induction region, configured such that an image in which the virtual batter swings and misses is realized when the ball pitched by the user reaches the swinging-and-missing induction region as the result of sensing performed by the sensor, and an out induction region, configured such that an image in which the virtual batter grounds out or flies out is realized when the ball pitched by the user reaches the out induction region as the result of sensing performed by the sensor, and performs control to display some of the partitioned regions of the strike zone as at least one of the swinging-and-missing induction region and the out induction region according to criteria preset for the induction region.

11. The apparatus according to claim 9, wherein the controller presets a probability of the virtual batter performing at least one of swinging and missing, grounding out, and flying out or determines the probability based on hitting data of the virtual batter extracted from a data storage for storing hitting data of each virtual player, and performs control such that the virtual batter performs one of swinging and missing, grounding out, and flying out according to the preset probability or the determined probability in a case in which the ball pitched by the user reaches the induction region as the result of sensing performed by the sensor.

12. The apparatus according to claim 9, wherein the controller performs control such that, in a case in which the ball pitched by the user reaches one of the partitioned regions of the strike zone as the result of sensing performed by the sensor, the region of the strike zone that the ball reaches is displayed as a danger region so as to be distinguished from the other regions, and such that an image in which the virtual batter performs one of fouling, making a hit, and hitting a home run is realized upon determining that a next ball pitched by the user reaches the danger region as the result of sensing performed by the sensor.

* * * * *